United States Patent [19]

Holderness

[11] 4,213,724
[45] Jul. 22, 1980

[54] CONVEYOR APPARATUS FOR STACKING AND DISTRIBUTING COMMINUTED MATERIAL

[75] Inventor: Eugene R. Holderness, Claremont, Calif.

[73] Assignee: Occidental Research Corporation, La Verne, Calif.

[21] Appl. No.: 866,047

[22] Filed: Dec. 30, 1977

[51] Int. Cl.² ............................................. B65G 65/28
[52] U.S. Cl. .................................... 414/133; 198/367; 198/508; 198/637; 198/865; 414/302
[58] Field of Search .......... 214/10, 152, 16 R, 17 CB; 198/508, 317, 353, 364, 367, 368, 442, 585, 636, 637, 865; 414/786, 133, 158, 283, 301, 302

[56] References Cited

U.S. PATENT DOCUMENTS

| 2,895,625 | 7/1959 | Clark | 214/17 CB |
| 3,980,189 | 9/1976 | Proner | 214/10 X |

OTHER PUBLICATIONS

Morgen Side Discharge Conveyor-Models PS & CRS, pp. 1 & 2.

Primary Examiner—Frank E. Werner
Attorney, Agent, or Firm—Christie, Parker & Hale

[57] ABSTRACT

A conveyor apparatus for stacking and distributing comminuted material including a fixed first support, a second support supported by the first support and capable of rotation about a vertically extending axis, an arm secured to the second support and concomitantly rotatable with the second support, a rotating mechanism for rotating the second support about the rotational axis, a first pulley secured to one end of the arm, a second pulley secured to the arm between the second support and the end of the arm opposite the first pulley, an endless conveyor belt around the first and second pulleys, support elements along the arm to support the conveyor belt, an actuating mechanism for driving the conveyor belt about the first and second pulleys, a plow supported by the arm having a plow blade above and in proximity to the conveyor belt and a reversible winch for moving the plow along the arm.

12 Claims, 4 Drawing Figures

CONVEYOR APPARATUS FOR STACKING AND DISTRIBUTING COMMINUTED MATERIAL

BACKGROUND OF THE INVENTION

The present invention relates to a conveyor apparatus useful for stacking and distributing comminuted material. More particularly, it relates to a conveyor apparatus for evenly stacking and distributing comminuted material over a surface to substantially prevent uneven buildup and pocket concentrations of the material at various sites on such a surface. The conveyor apparatus of this invention is particularly suited to distribute comminuted industrial, municpal and residential solid waste material.

Present techniques of handling solid waste material from industrial, municipal and residential sites are becoming serious pollution problems and create unsightly stockpiles of such waste material. Conventional methods of disposal generally consist of dumping such solid waste material in a solitary mound and then pushing that mound over a given area or leveling the mound by the means of a tractor. Such conventional methods make the reuse or recycling of such waste material difficult due to the concentration of particular types of solid wastes in pockets within the stockpile of waste material.

SUMMARY OF THE INVENTION

In accordance with the invention, there is disclosed a conveyor apparatus for stacking and distributing comminuted material including a fixed first support, a second support supported by the first support and capable of rotation about a vertically extending rotational axis through such second support, an arm secured intermediate its length to the second support, said arm concomitantly rotatable with said second support about the rotational axis intersecting the arm, a means for rotating the second support and concomitantly therewith the arm about the rotational axis, a first pulley secured to one end of the arm, a second pulley secured to the arm between the second support and the end of the arm opposite the first pulley, an endless conveyor belt extending around the first and second pulleys to form a closed loop, means positioned along the arm to support the conveyor belt, a means for driving the endless conveyor belt around the first and second pulleys, a plow capable of traversing a length of the arm between the first and second pulleys and having a plow blade positioned above and in close proximity to the surface of the conveyor belt and a means for moving the plow along the arm between the first and second pulleys.

Also disclosed is a method for distributing material over a surface by using the conveyor apparatus of this invention. Material to be distributed upon a surface is introduced onto the endless conveyor belt of the conveyor apparatus. The material is introduced onto the conveyor belt directly above the conveyor belt and along the rotational axis for the arm. The conveyor belt moves substantially in a horizontal path axially and outwardly along the arm that is simultaneously rotating about the rotational axis. A plow having a plow blade positioned in spaced relation to the moving conveyor belt engages the material carried by the conveyor belt. The plow blade deflects the material off the side of the conveyor belt onto the surface below the rotating arm. The plow is supported by the arm and is capable of lateral movement along the arm such that the point at which the plow encounters the material on the conveyor belt can be varied, thereby varying the position along the arm at which the material is deflected. The material is thereby distributed upon the surface in a varying circular pattern of increasing and decreasing radii.

BRIEF DESCRIPTION OF THE DRAWINGS

These and other features and advantages of the present invention will be appreciated as the same becomes better understood by reference to the following detailed description of presently preferred embodiments when considered in connection with the accompanying drawings wherein.

DETAILED DESCRIPTION

The conveyor apparatus of this invention is designed to distribute material over a circular surface in such a manner that the material is substantially evenly distributed to form substantially planar surfaces, sequentially over the circular surface. The conveyor apparatus is particularly designed to distribute comminuted material over such a surface. The comminuted material distributed is substantially averaged over the surface by the random type distribution pattern provided by the conveyor apparatus of this invention. Such a random type distribution pattern is provided by the conveyor apparatus which distributes the comminuted material as the conveyor apparatus rotates an arm having an endless conveyor belt moving axially outward along the rotating arm. A plow concomitantly traverses the rotating arm to deflect material traveling along the endless conveyor belt off the side or sides of the conveyor belt. The comminuted material is thereby distributed over the circular surface in a circular pattern having varying radii as the plow moves inward and outward along the arm.

The term "comminuted material" as used herein refers to any material that has been conditioned such as by crushing, chopping, tearing, shredding, grinding, macerating and the like.

Figure 1:
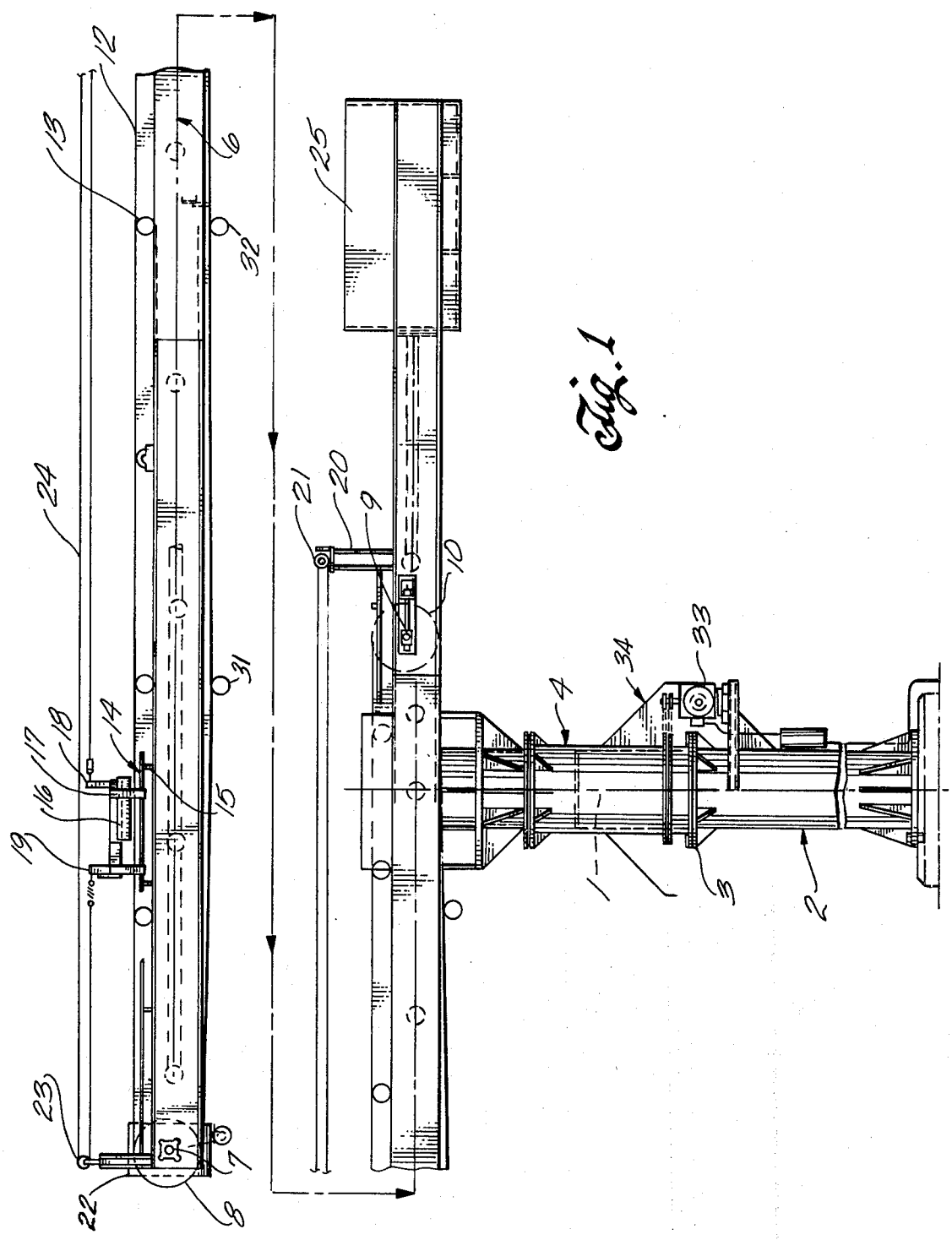
FIG. 1 is a schematic lateral view of the conveyor apparatus of this invention.
Figure 2:
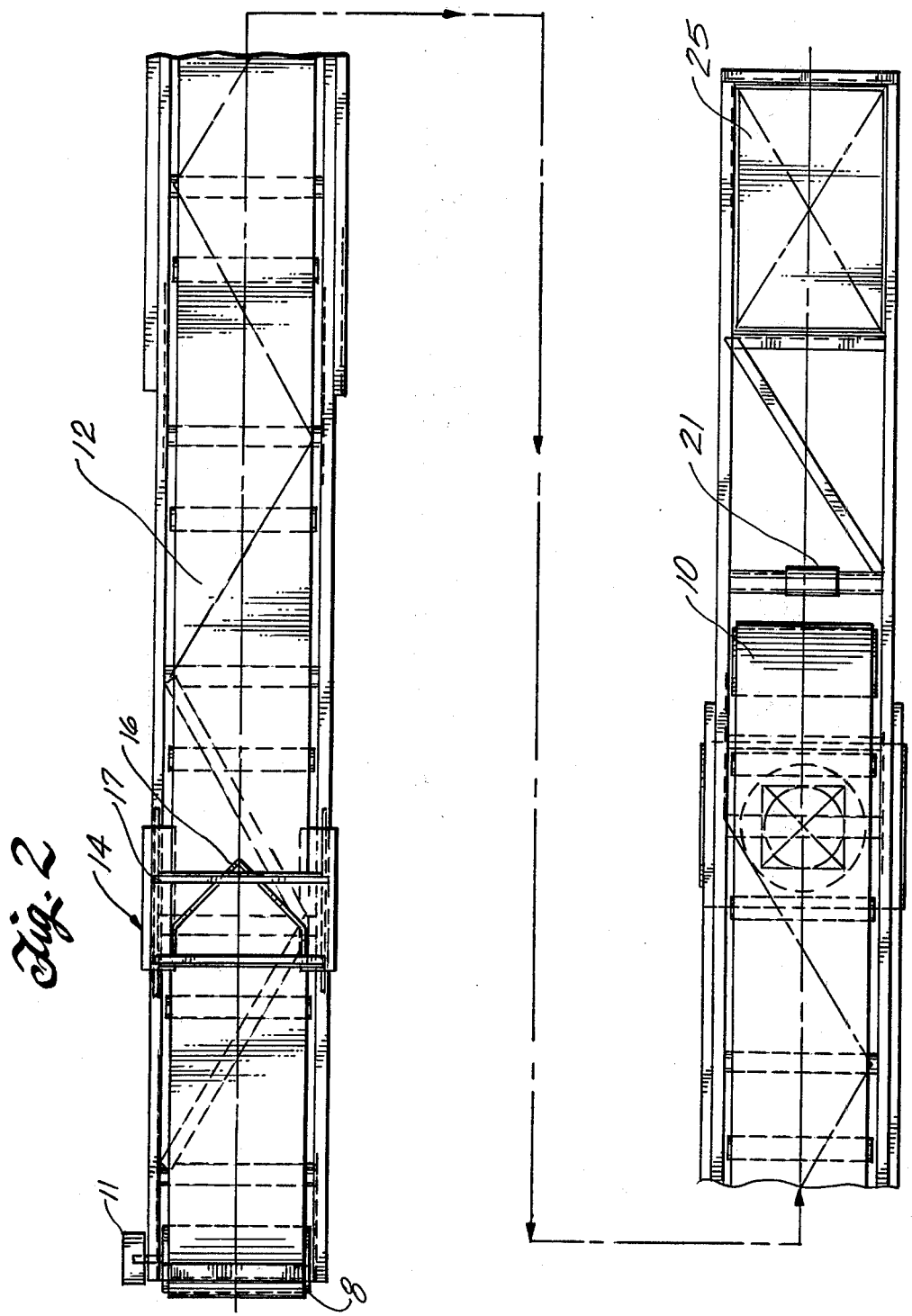
FIG. 2 is a schematic aerial view of the conveyor apparatus of this invention.

With reference to FIG. 1, the conveyor apparatus of this invention comprises a first support 2 secured to a surface within an area over which comminuted material is to be distributed. The first support 2 can have any convenient configuration, with a particularly preferred configuration being cylindrical as shown in FIG. 1.

Figure 3:
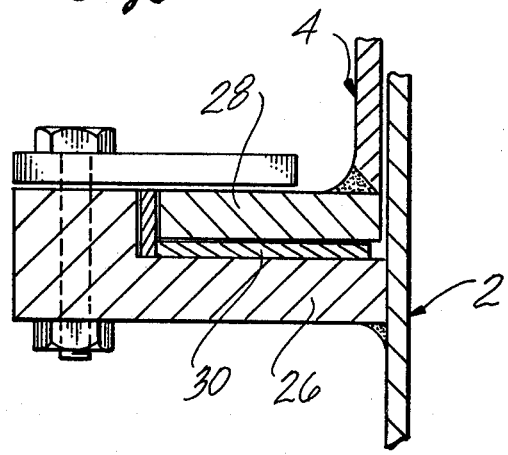
FIG. 3 is a schematic view of an embodiment of supportive means for the conveyor apparatus of this invention.

Supported by the first support 2 is a second support 4. Second support 4 is supported by the first support 2 by means 3 provided on first support 2. Such means 3 can be any convenient means capable of supporting the upper parts of the conveyor apparatus. The second support 4 is supported in such a manner that it is free to rotate about a vertically extending rotational axis 1 extending through the second support and the conveyor apparatus. FIG. 3 illustrates a preferred means for supporting second support 4. A flange 26 is provided on the side of first support 2 such that the second support 4 is free to rotate. With reference to FIG. 3 there is provided a flange 28 on the second support 4. Flange 28 is supported by corresponding flange 26 on the first support 2 and is separated therefrom by a lubricating means 30, such as a lubricating bearing, lubricating fluid, roller bearings and the like, which permits the second support to rotate by substantially reducing the friction between flanges 26 and 28.

Again with reference to FIG. 1, an arm 6 is secured intermediate its length to the second support 4. Arm 6 is concomitantly rotatable with second support 4 about the vertically extending axis 1 which intersects arm 6.

A first pulley 8 is secured to an end of arm 6 through its center shaft 7. The first pulley 8 is free to rotate about its center shaft 7. A second pulley 10 is secured to arm 6 by its center shaft 9. Pulley 10 is free to rotate about its center shaft 9. Pulley 10 is positioned along arm 6 between the point of attachment of the second support 4 and the end of arm 6 opposite the end to which pulley 8 is secured.

An endless conveyor belt 12 extends around pulleys 8 and 10 to form a closed loop path about the pulleys. A means is provided along arm 6 to support the conveyor belt 12 and permit the conveyor belt to move freely while carrying material along the arm. Such a means can be a plurality of rollers 13 positioned along the length of the arm between pulleys 8 and 10 to support the conveyor belt 12 as it travels about the closed loop path around pulleys 8 and 10. A means 11 is provided for driving conveyor belt 12 around pulleys 8 and 10.

Figure 4:
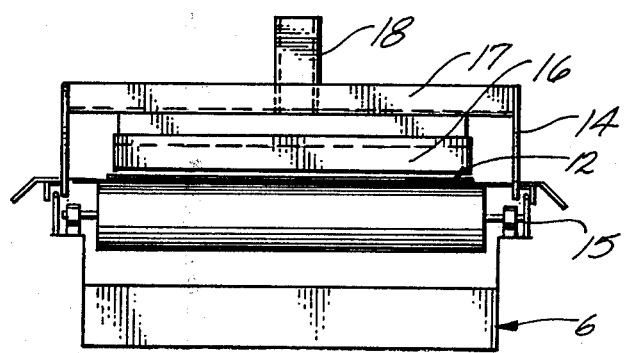
FIG. 4 is a schematic view of a preferred means for deflecting material from the conveyor apparatus.

Supported on arm 6 is a plow 14 which is supported by means 15. Such means 15 permits plow 14 to traverse the length of arm 6 between pulleys 8 and 10. Such means 15 can include wheels, rollers, slide runners and the like, either in a track or channel provided in arm 6. With reference to FIG. 4, plow 14 is constructed in such a manner that it straddles conveyor belt 12 and is capable of traversing back and forth axially along arm 6 and in spaced relation to endless conveyor belt 12. Plow 14 has a support element 17 that supports a plow blade 16 above and in close proximity to conveyor belt 12. Plow blade 16 is designed to deflect material, traveling along conveyor belt 12 off the side or sides of the conveyor belt 12. Plow blade 16 can be diagonally fixed in relation to conveyor belt 12 or the plow blade can have a generally wedge or V-shape. If plow blade 16 is in a diagonal position relative to conveyor belt 12, the plow blade will deflect material off one side of the conveyor belt. If plow blade 16 is V-shaped, it can deflect material off both sides of conveyor belt 12. Such a support element 17 on plow 14 can be adjustable to permit the height of the plow blade 16 above conveyor belt 12 to be varied. By varying the height of the plow blade 16, the blade can be positioned to deflect substantially all the material carried by the conveyor belt. Material not deflected by plow blade 16 is conveyed along the arm 6 by conveyor belt 12 falling off the end of the arm as the conveyor belt 12 reverses its direction of travel around pulley 8 at the end of the arm.

Also provided by the apparatus of this invention is a means for moving plow 14 along arm 6. A particularly preferred means is the means illustrated in FIG. 1. Such means includes a first member 18 on one end of plow 14 and a second member 19 on the opposite end of plow 14. Such means also includes a first member 20 attached to arm 6 near pulley 10, said first member 20 having a reversible drum winch 21 attached thereto. A second member 22 is attached to arm 6 near pulley 8. Attached to second member 22 is a pulley 23. A cable 24 is connected by one of its ends to member 18 on plow 14. The cable 24 extends to and around reversible drum winch 21. From winch 21 the cable extends to and around pulley 23 and therefrom to plow 14 where the other end of cable 24 is secured to second member 19 on plow 14. Operation of reversible drum winch 21 thereby moves plow 14 inward and outward axially along arm 6.

On arm 6 of the conveyor apparatus of this invention is a counterweight 25. Counterweight 25 is secured to arm 6 at the end of the arm opposite pulley 8. Counterweight 25 balances that portion of arm 6 extending from second support 4 to pulley 8 and any material that is transported on conveyor belt 12.

There may also be provided along the closed loop path of conveyor belt 12 means for removing debris from the conveyor belt once the conveyor belt has passed by plow 14. Such means can include a brush belt wiper 31, a rubber belt wiper 32 and the like. In FIG. 1 such means are, for convenience, shown located on the underneath side of arm 6 as the conveyor belt 12 travels inward along the arm.

Means 33 is also included for rotating second support 4 about axis 1 and thereby concomitantly rotating arm 6 about axis 1. Means 33 can be any convenient drive means for imparting rotation to second support 4; such as, a gear drive mechanism, a chain drive mechanism, a belt drive mechanism and the like. Particularly preferred is a means for turning a sprocket and a chain engaging the sprocket, the chain further engaging a corresponding sprocket secured to second support 4, thereby rotating second support 4. A protective shield 34 may be provided attached to support 4 above means 33 for preventing material being deflected from conveyor belt 12 from falling into the rotating drive means 33.

The description of the conveyor apparatus will be better understood by the following discussion of a working embodiment of a process for distributing comminuted material utilizing a conveyor apparatus of this invention.

The conveyor apparatus of this invention is positioned within an area over which comminuted material is to be distributed. The height of the arm above the surface is adjusted to any height, dependent only on the desired height of the stockpile of comminuted material. The length of the arm of the conveyor apparatus is selected to cover the circular area over which the comminuted material is to be distributed. Long extensions of the arm can be counterbalanced by additional weight in the counterweight.

The means are engaged to rotate the arm 6 in a continuous 360° pathway about the vertically extending rotational axis 1. As the arm 6 rotates, the means 11 for driving the conveyor belt 12 is also engaged driving conveyor belt 12 around pulleys 8 and 10.

The comminuted material to be distributed over the surface below the path of the arm is introduced onto the conveyor belt along the vertically extending rotational axis 1 directly above the first and second supports 2 and 4 for the conveyor apparatus. The moving conveyor belt 12 carries the comminuted material along arm 6 toward pulley 8. As the comminuted material is carried along the conveyor belt it encounters plow 14 positioned along the conveyor belt pathway. The plow blade 16 deflects the comminuted material off the side of the conveyor belt. The comminuted material falls from the rotating arm 6 onto the surface below.

Simultaneously with the rotation of the arm and the axial movement of the conveyor belt along the arm, the plow 14 travels along the arm between pulleys 8 and 10. The movement of plow 14 inward and outward along arm 6 deflects the comminuted material from conveyor belt 12 at various positions along arm 6. This movement of the plow between pulleys provides for an even distribution of the comminuted material deflected off the conveyor belt. The comminuted material is thereby distributed onto the surface in increments providing an even distribution and layering effect of the comminuted material upon the surface. Within a given area on the surface there is substantially no concentration of a particular comminuted waste material that was introduced onto the conveyor.

The rotation of the arm about the rotational axis, the movement of the conveyor belt outward along the arm and the back and forth travel of the plow along the arm between the pulleys provide substantially an even distribution of comminuted material over the circular surface. There is, however, substantially no distribution of the comminuted material near the support for the conveyor apparatus. Thus the stockpile of comminuted material is substantially circular with a void space in the center occupied by the support.

The invention is further illustrated by the following detail of an operative unit. The conveyor apparatus was constructed to separate shredded and comminuted industrial, municipal and residential waste material.

A first support was constructed to form a cylindrical support approximately 12 feet high. This first support was secured to the surface over which the comminuted material was to be distributed. The first support was fitted with a flange about eight feet above the surface. A second cylindrical support about eight feet long, having an inside diameter greater than the outside diameter of the first support, was fitted over the first support. A flange on the lower end of the second support engaged the flange on the first support. A lubricating bearing was placed between the two flanges. The second support was freely rotated on the first support about an axis extending through the center of the cylindrical second support.

An arm approximately 56 feet long was secured to the top of the second support. The arm concomitantly rotated with the second support about the vertical rotational axis. The arm was approximately 40 inches wide and was constructed of tubular metal. The arm was secured intermediate its length to the second support to provide one end of the arm extending about 38 feet from the axis of rotation and the other end extending about 18 feet from the axis of rotation. A cylindrical first pulley was secured to the end of the arm farthest from the rotational axis. The pulley had a diameter of about 20 inches and a two inch in diameter center shaft. A second cylindrical pulley with a diameter of 20 inches and a 1½ inch diameter center shaft was secured to the arm four feet from the rotational axis and 42 feet from the first pulley. An endless conveyor belt 36 inches wide and forming a closed loop approximately 45 feet long was placed around the pulleys. The conveyor belt was supported along the arm by a plurality of five inch idler rollers positioned above and below the arm. A three horsepower motor was provided to drive the conveyor belt about the pulleys.

A plow was placed on the arm straddling the conveyor belt. The plow was supported by wheels which allowed the plow to travel along a track extending axially along and secured to the arm between the pulleys. A plow blade was secured to the plow. The plow blade was generally V-shaped with the vertex of the V positioned substantially over the center of the conveyor belt. The plow blade was positioned relative to the conveyor belt to deflect substantially all material traveling along the conveyor off the sides of the belt. The open end of the V-shaped plow faced away from the rotational axis of the arm.

A reversible drum winch with a one-half horsepower motor was secured to the arm approximately six feet from the rotational axis near the second pulley for the conveyor. Around the winch was wound a ⅛ inch in diameter galvanized cable. The cable ends were secured to the plow. The cable extended from the plow around the winch, to and around a pulley secured to the end of the arm farthest from the rotational axis and back to the plow. The reversible winch was capable of moving the plow back and forth along the length of the arm between the pulleys of the conveyor belt.

A counterweight was secured to the arm to balance the long end of the arm.

Rotation was imparted to the second support, and therefore the arm, by a one-half horsepower motor which drove a chain and sprocket mechanism. The second support was provided with a sprocket which engaged the chain driven by the one-half horsepower motor.

The comminuted industrial, municipal and residential waste was introduced to the conveyor by a feed chute positioned above the rotational axis of the arm. The particular comminuted material distributed by this working embodiment had a particle size of up to about four inches. The comminuted material was carried by the conveyor belt along the arm. The plow was positioned above the conveyor belt to deflect substantially any material carried by the conveyor belt off the conveyor belt. As the comminuted material, moving outwardly along the arm on the conveyor belt, engaged the plow, also moving inward and outward along the arm, the comminuted material was deflected off the sides of the conveyor belt and fell to the surface below. As the plow reached either the rotational axis or the pulley on the end of the arm its direction of travel was changed by the winch. Simultaneously the arm was in constant rotation about the rotational axis. The comminuted material was thus distributed at various distances from the rotational axis as well as in varying arcs upon a substantially circular surface about 76 feet in diameter. About a four foot center of the circular surface remained over which substantially no material was distributed due to the presence of the support.

The conveyor apparatus of this invention is particularly useful in a multi-step process for the treatment of solid waste for recovery of values contained therein for recycle back to the economy. Such a process in which the conveyor apparatus of this invention can be utilized is the process disclosed in application Ser. No. 719,261 filed Aug. 31, 1976, now issued as U.S. Pat. No. 4,077,847, on Mar. 7, 1978 and assigned to the same assignee as the present invention, which application is herein incorporated by reference.

In such a multi-step process industrial, municipal and residential solid waste is received at a waste reclamation site. The waste material is sent to a waste material storage pit or is sent to a waste conditioner wherein the solid waste is shredded, crushed, ground, macerated and generally comminuted to a particle size up to about 4 inches to enable the eventual separation by classification into predominantly inorganic and predominantly organic fractions.

Such comminuted solid waste material is substantially dry with water and other liquids having been removed during the comminution step. However, the comminuted waste material can absorb moisture. Further such comminuted material presents an onerous problem if not quickly used. The comminuted waste material can decay and degrade due to air and moisture within the stockpiles of such comminuted waste material. Such decay and degradation causes an environmental problem and may present an odor problem as well as presenting a health problem and an unsightly stockpile which may be infested by vermin of varying types.

Using the conveyor apparatus of the present invention, the comminuted waste material is distributed over a stockpile in small increments as the conveyor arm rotates about the rotational axis and as the plow traverses along the arm pushing waste material from the conveyor belt in increments of increasing and decreasing radii from the rotational axis. The comminuted solid waste material is thereby evenly spread over a circular surface of a stockpile. Distributing such waste material in such an incremental manner reduces the probability of forming air pockets within the stockpile thereby inhibiting degradation to a degree such that substantially lesser odor problems are encountered. The stockpile is a layered stockpile having an averaged distribution of solid waste material throughout due to the incremental manner of distributing waste material over the surface of the stockpile. Averaging such waste material over the stockpile can prevent "hotspots" from forming thereby decreasing the possibility of spontaneous combustion within the stockpile. Such a layered stockpile also inhibits infestation by vermin as gaps, burrows and voids are minimized. Removing material from such a stockpile formed by the conveyor apparatus and method of this invention also provides a substantially average cross section of waste material to be processed in a subsequent step of the reclamation process.

What is claimed is:

1. A conveyor apparatus for stacking and distributing comminuted material comprising:
    (a) a fixed first support;
    (b) a second support supported by the first support and capable of rotation about a vertically extending rotational axis through such second support;
    (c) an arm secured intermediate its length to the second support, said arm concomitantly rotatable with said second support about the vertically extending rotational axis intersecting the arm;
    (d) a means for rotating the second support and concomitantly therewith the arm about the vertically extending rotational axis;
    (e) a first pulley secured to one end of the arm;
    (f) a second pulley secured to the arm between the second support and the end of the arm opposite the first pulley;
    (g) an endless conveyor belt extending around the first and second pulleys to form a closed loop having an axial path of travel along the arm around such a closed loop;
    (h) means positioned along the arm between the first and second pulleys for supporting the conveyor belt;
    (i) a means for driving the conveyor belt around the first and second pulleys;
    (j) a plow capable of traversing a length of the arm between the first and second pulleys and having a plow blade positioned above and in close proximity to the surface of the conveyor belt;
    (k) a reversible winch secured to the arm in proximity to the second pulley;
    (l) a third pulley secured to the arm in proximity to the first pulley;
    (m) a cable with one end attached to the plow, extending through and around the third pulley and around the winch with the remaining end of the cable attached also to the plow; and
    (n) means for driving the winch.

2. A conveyor apparatus as recited in claim 1 wherein the plow has a plow blade extending diagonally across the conveyor belt.

3. A conveyor apparatus as recited in claim 1 wherein the plow has a generally V-shaped plow blade.

4. A conveyor apparatus as recited in claim 1 further comprising:
    a flange on the first support and a flange on the second support, the two flanges separated by a means for allowing substantially reduced friction between the flanges.

5. The conveyor apparatus as recited in claim 1 further comprising:
    a brush belt wiper for removing debris from the conveyor belt, positioned along the path of travel for the conveyor belt after the conveyor belt has passed the plow.

6. The conveyor apparatus as recited in claim 1 further comprising:
    a rubber belt wiper for removing debris from the conveyor belt, positioned along the path of travel of the conveyor belt after the conveyor belt has passed the plow.

7. A conveyor apparatus for stacking and distributing comminuted industrial, municipal and residential waste material comprising:
    (a) a support secured to a surface upon which comminuted material is to be distributed;
    (b) an arm rotationally attached to said support capable of rotation about a vertically extending rotational axis;
    (c) means for rotating the arm about the vertically extending rotational axis;
    (d) a first pulley secured to a first end of the arm;
    (e) a second pulley secured intermediate the length of the arm between the vertically extending rotational axis and the second end of the arm;
    (f) an endless conveyor belt extending about the first and second pulleys having an axial path of travel along the arm capable of carrying comminuted material from the point of introduction of such comminuted material outward along the arm;
    (g) means for supporting the conveyor belt;
    (h) means for imparting movement to the conveyor belt about the first and second pulleys;
    (i) a plow capable of traversing axially along the arm between the first pulley and the point of introduction of the comminuted material and having a plow blade in spaced relation to the conveyor belt for engaging comminuted material carried by the conveyor belt and deflecting such comminuted material off the conveyor belt onto the surface below; and
    (j) means for imparting movement to the plow to enable the plow to traverse axially and selectively inward and outward along the arm whereupon the point of engagement of the plow blade and the comminuted material correspondingly moves inward and outward along the arm thereby distributing such comminuted material in an incremental circular pattern of increasing and decreasing radii upon the surface, said means comprising a reversible winch secured to the arm in proximity to the second pulley, a third pulley secured to the arm in proximity to the first pulley, a cable with one end thereof attached to the plow, the cable extending through and around the reversible winch and attached by the remaining end to the plow, and means for reversibly and selectively driving the winch.

8. A conveyor apparatus as recited in claim 7 wherein the plow has a blade extending diagonally across the conveyor belt.

9. A conveyor apparatus as recited in claim 7 wherein the plow has a generally V-shaped plow blade.

10. The conveyor apparatus as recited in claim 7 further comprising:
a brush belt wiper for removing debris from the conveyor belt, positioned along the path of travel of the conveyor belt after the conveyor belt has passed the plow.

11. The conveyor apparatus as recited in claim 7 further comprising:
a rubber belt wiper for removing debris from the conveyor belt, positioned along the path of travel of the conveyor belt after the conveyor belt has passed the plow.

12. A conveyor apparatus for stacking and distributing comminuted material comprising:
(a) a fixed first support;
(b) a second support supported by the first support and capable of rotation about a vertically extending rotational axis through such second support;
(c) a flange on the first support and a flange on the second support, the two flanges separated by a means for allowing substantially reduced friction between the flanges;
(d) an arm secured intermediate its length to the second support, said arm concomitantly rotatable with said second support about the vertically extending rotational axis intersecting the arm;
(e) a means for rotating the second support and concomitantly therewith the arm about the vertically extending rotational axis;
(f) a first pulley secured to one end of the arm;
(g) a second pulley secured to the arm between the second support and the end of the arm opposite the first pulley;
(h) an endless conveyor belt extending around the first and second pulleys to form a closed loop having an axial path of travel along the arm around such a closed loop;
(i) means positioned along the arm between the first and second pulleys for supporting the conveyor belt;
(j) a means for driving the conveyor belt around the first and second pulleys;
(k) a plow capable of traversing a length of the arm between the first and second pulleys and having a plow blade positioned above and in close proximity to the surface of the conveyor belt; and
(l) a means for moving the plow along the arm between the first and second pulleys as the arm rotates about the vertically extending rotational axis.

* * * * *

UNITED STATES PATENT AND TRADEMARK OFFICE
CERTIFICATE OF CORRECTION

PATENT NO. : 4,213,724

DATED : July 22, 1980

INVENTOR(S) : Eugene R. Holderness

It is certified that error appears in the above—identified patent and that said Letters Patent is hereby corrected as shown below:

IN THE SPECIFICATION:

Column 1, line 15, "municpal" should be -- municipal --.

Column 3, line 63, delete "means" and insert -- apparatus --.

IN THE CLAIMS:

Column 8, line 28, "for" should be -- of --.

Signed and Sealed this

Fourth Day of November 1980

[SEAL]

Attest:

SIDNEY A. DIAMOND

Attesting Officer

Commissioner of Patents and Trademark

UNITED STATES PATENT AND TRADEMARK OFFICE
CERTIFICATE OF CORRECTION

PATENT NO. : 4,213,724

DATED : July 22, 1980

INVENTOR(S) : EUGENE R. HOLDERNESS

It is certified that error appears in the above-identified patent and that said Letters Patent is hereby corrected as shown below:

Col. 1, following the Title, please insert:

--The invention described herein (or "in this patent") was made in the course of work under U.S. Environmental Protection Agency Grant No. S801588. The Government of the United States has certain rights in this invention.--

Signed and Sealed this

Tenth Day of February, 1987

Attest:

DONALD J. QUIGG

Attesting Officer

Commissioner of Patents and Trademarks